(12) United States Patent
Fukuda et al.

(10) Patent No.: US 12,197,051 B2
(45) Date of Patent: Jan. 14, 2025

(54) OPTICAL INSPECTION CIRCUIT AND OPTICAL INSPECTION METHOD

(71) Applicant: Nippon Telegraph and Telephone Corporation, Tokyo (JP)

(72) Inventors: Hiroshi Fukuda, Tokyo (JP); Toru Miura, Tokyo (JP); Yoshiho Maeda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 522 days.

(21) Appl. No.: 17/609,092

(22) PCT Filed: May 23, 2019

(86) PCT No.: PCT/JP2019/020473
§ 371 (c)(1),
(2) Date: Nov. 5, 2021

(87) PCT Pub. No.: WO2020/235083
PCT Pub. Date: Nov. 26, 2020

(65) Prior Publication Data
US 2022/0229317 A1    Jul. 21, 2022

(51) Int. Cl.
*G02F 1/025* (2006.01)
*G01M 11/00* (2006.01)

(52) U.S. Cl.
CPC .............. *G02F 1/025* (2013.01); *G01M 11/00* (2013.01)

(58) Field of Classification Search
None
See application file for complete search history.

(56) References Cited

U.S. PATENT DOCUMENTS

2009/0042538 A1    2/2009  Cho et al.
2015/0277207 A1   10/2015  Fujikata
2019/0222319 A1*   7/2019  Keil ...................... H04B 10/548

FOREIGN PATENT DOCUMENTS

CN      106411399 A    2/2017
JP      2015191068 A   11/2015

OTHER PUBLICATIONS

Fukuda, H., et al., "Estimation of Optical Modulator Efficiency From Electrical Characteristics," 2018 IEEE 15th International Conference on Group IV Photonics, 18162656, pp. 11-12.
(Continued)

*Primary Examiner* — Chad H Smith
(74) *Attorney, Agent, or Firm* — SLATER MATSIL, LLP

(57) ABSTRACT

In an embodiment, an optical inspection circuit includes: an optical modulator comprising an optical waveguide on a substrate, the optical waveguide having a core comprising a semiconductor; a first input waveguide optically connected to the optical modulator, the first input waveguide having a core comprising the semiconductor; an output waveguide optically connected to the optical modulator, the output waveguide having a core comprising the semiconductor; a photodiode on the substrate in a vicinity of the optical modulator; a wire electrically connecting the optical modulator and the photodiode; and a second input waveguide optically connected to the photodiode, the second input waveguide having a core comprising the semiconductor.

14 Claims, 4 Drawing Sheets

(56) References Cited

OTHER PUBLICATIONS

Maeda, Y, et al., "Novel fiber alignment method for on-wafer testing of silicon photonic devices with PN junction embedded grating couplers," 2018 IEEE 15th International Conference on Group IV Photonics, 18162636, pp. 81-82.

Miura, T., et al., "Novel quick and precise method for evaluating optical characteristics," 2018 IEEE 15th International Conference on Group IV Photonics, 18162651, pp. 95-96.

* cited by examiner

OPTICAL INSPECTION CIRCUIT AND OPTICAL INSPECTION METHOD

CROSS-REFERENCE TO RELATED APPLICATION

This application is a national phase entry of PCT Application No. PCT/JP2019/020473, filed on May 23, 2019, which application is hereby incorporated herein by reference.

TECHNICAL FIELD

The present invention relates to an optical inspection circuit and an optical inspection method to inspect an optical circuit.

BACKGROUND

A silicon photonics technology is anticipated as a basic technology for cost reduction of optical devices in the future. However, in order to genuinely realize the cost reduction, reduction in assembly and inspection costs of optical modules is demanded. In particular, in order to reduce the inspection costs, wafer level inspection which allows a multitude of chips to be measured in a short period of time is required.

Although there have been some suggestions regarding a wafer level inspection technology for the optical devices (Non-Patent Literatures 1, 2, and 3), there have been few technologies which can be applied to active devices such as optical modulators. This is because each of the optical modulators is a device which converts an electrical signal to an optical signal and a response speed demanded in general is a high speed of 10 gigahertz or more.

CITATION LIST

Non-Patent Literature

Non-Patent Literature: 1: Y. Maeda et al., "Novel fiber alignment method for on-wafer testing of silicon photonic devices with PN junction embedded grating couplers", 2018 IEEE 15th International Conference on Group IV Photonics, 18162636, pp. 81-82, 2018.

Non-Patent Literature 2: T. Miura et al., "Novel quick and precise method for evaluating optical characteristics", 2018 IEEE 15th International Conference on Group IV Photonics, 18162651, pp. 95-96, 2018.

Non-Patent Literature 3: H. Fukuda et al., "Estimation of Optical Modulator Efficiency From Electrical Characteristics", 2018 IEEE 15th International Conference on Group IV Photonics, 18162656, pp. 11-12, 2018.

SUMMARY

Technical Problem

As described above, since in wafer level inspection for active devices such as optical modulators, the demanded response speed is a high speed of 10 gigahertz or more, a line which transmits the high-speed electrical signal without loss is desired. In order to apply the line, which transmits the high-speed electrical signal without the loss, to the wafer level inspection, a probe card which is excellent in high frequency characteristics is needed. However, this kind of the probe card and a high frequency cable which connects the probe card and a device targeted for the inspection are expensive. In addition thereto, in order to conduct inspection whose reproducibility is high, extreme caution in arranging the probe card and the high frequency cable is desired, the inspection cannot be easily conducted, and such inspection is hardly accepted in a mass production process.

In order to solve the above-described problems, the present invention was devised, and an object of embodiments of the present invention is to enable wafer level inspection for optical circuits such as optical modulators to be further easily and further inexpensively implemented.

Means for Solving the Problem

An optical inspection circuit according to an embodiment of the present invention includes: an optical modulator comprising an optical waveguide formed on a substrate, the optical waveguide having a core comprising a semiconductor; a first optical waveguide constituted of an optical waveguide having a core comprising the semiconductor and is optically connected to the optical modulator; a second optical waveguide constituted of an optical waveguide having a core comprising the semiconductor and is optically connected to the optical modulator, a photodiode formed on the substrate in a vicinity of the optical modulator, a wire electrically connecting the optical modulator and the photodiode; and a third optical waveguide constituted of an optical waveguide having a core comprising the semiconductor and is optically connected to the photodiode.

In one configuration example of the above-mentioned optical inspection circuit, a plurality of the optical modulators is formed, and the wire connects each of the plurality of optical modulators and the photodiode.

In one configuration example of the above-mentioned optical inspection circuit, a plurality of the photodiodes is formed, and the wire connects the optical modulator and each of the plurality of photodiodes.

In one configuration example of the above-mentioned optical inspection circuit, an optical distributor which distributes inputted signal light to the first optical waveguide and the third optical waveguide is further included.

In one configuration example of the above-mentioned optical inspection circuit, the semiconductor is formed of silicon, and the photodiode is a germanium photodiode.

An optical inspection method according to an embodiment of the present invention includes: a first step of making continuous light incident to an optical modulator comprising an optical waveguide formed on a substrate, the optical waveguide having a core comprising a semiconductor; a second step of making modulated signal light incident to a photodiode formed on the substrate in a vicinity of the optical modulator and is electrically connected to the optical modulator, and a third step of evaluating modulated light outputted from the optical modulator.

Effects of the Invention

As described above, according to embodiments of the present invention, since on the substrate on which the optical modulator is formed, the photodiode is formed, and the optical modulator and the photodiode are electrically connected by the wire, inspection of an optical circuit such as an optical modulator at a wafer level can be further easily and further inexpensively implemented.

DESCRIPTION OF EMBODIMENTS

Figure 1:
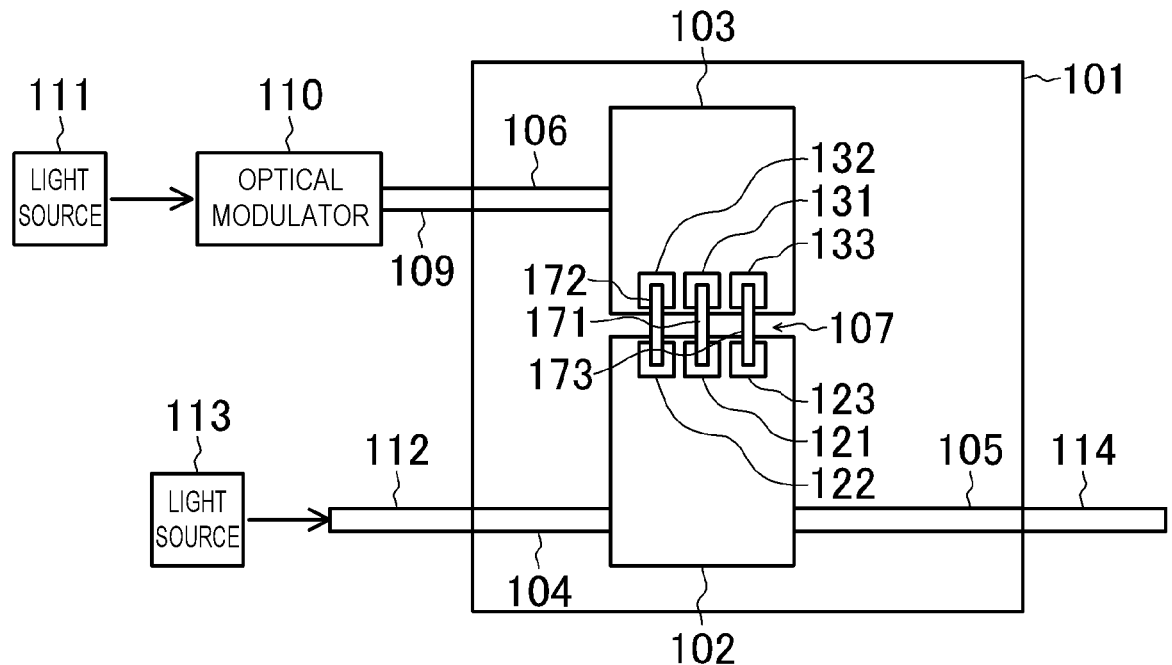
FIG. 1 is a configuration diagram illustrating a configuration of an optical inspection circuit according to an embodiment of the present invention.

Hereinafter, an optical inspection circuit according to an embodiment of the present invention will be described with reference to FIG. 1. This optical inspection circuit includes an optical modulator 102 formed on a substrate 101 and a photodiode 103 formed on the substrate 101 in the vicinity of the optical modulator 102.

The optical modulator 102 comprises an optical waveguide, and the optical waveguide has a core comprising a semiconductor. The optical modulator 102 can be configured of, for example, a Mach-Zehnder optical modulator in which a carrier abstraction type phase shifter including a pn junction formed in a rib type optical waveguide whose core is formed of silicon and a multi-mode interferometer are combined. This optical modulator can be manufactured by the heretofore known semiconductor device manufacturing technology such as the widely known lithography technology, ion implantation technology, thin film deposition technology, crystal growth technology, and etching technology.

The photodiode 103 is, for example, a germanium photodiode which is configured of a germanium layer selectively formed on the core comprising a semiconductor (for example, silicon) and a pn junction formed on both sides and upper and lower sides of this layer. The photodiode 103 can be manufactured by the heretofore known semiconductor device manufacturing technology such as the widely known lithography technology, ion implantation technology, thin film deposition technology, crystal growth technology, and etching technology.

In addition, optically connected to the optical modulator 102 is a first optical waveguide 104 as an input waveguide, which is constituted of an optical waveguide having a core comprising a semiconductor. In addition, optically connected to the optical modulator 102 is a second optical waveguide 105 as an output waveguide, which is constituted of an optical waveguide having a core comprising a semiconductor. In addition, optically connected to the photodiode 103 is a third optical waveguide 106 as an input waveguide, which is constituted of an optical waveguide having a core comprising a semiconductor.

In addition, the optical modulator 102 and the photodiode 103 are electrically connected by a wire 107. An electrical signal which is photoelectrically converted by the photodiode 103 and is outputted is electrically transmitted by the wire 107 and is inputted to the optical modulator 102. The optical modulator 102 modulates continuous light, inputted via the first optical waveguide 104, by the electrical signal inputted via the wire 107 and outputs the modulated continuous light to the second optical waveguide 105.

For example, the wire 107 is a high frequency line comprising a signal wire 171 and grounding wires 172 and 173. The signal wire 171 connects an electrode pad 121 of the optical modulator 102 and an electrode pad 131 of the photodiode 103. The grounding wire 172 connects an electrode pad 122 of the optical modulator 102 and an electrode pad 132 of the photodiode 103. The grounding wire 173 connects an electrode pad 123 of the optical modulator 102 and an electrode pad 133 of the photodiode 103.

In addition, optically connected to the third optical waveguide 106 via an optical fiber 109 is an optical modulator 110. The optical modulator 110 modulates continuous light emitted from a light source 111 and outputs the modulated continuous light to the optical fiber 109. The light source 111 comprises, for example, a semiconductor laser.

In addition, optically connected to the first optical waveguide 104 is an optical fiber 112, and inputted to the optical fiber 112 is continuous light emitted from a light source 113. The light source 113 comprises, for example, a semiconductor laser.

In this optical inspection circuit, first, the modulated light (signal light) emitted from the light source 111 and modulated by the optical modulator 110 is received via the optical fiber 109 and the third optical waveguide 106 by the photodiode 103. The modulated light received by the photodiode 103 is photoelectrically converted to a modulated electrical signal and is outputted via the wire 107 to the optical modulator 102.

In addition, the continuous light emitted from the light source 113 is inputted via the optical fiber 112 and the first optical waveguide 104 to the optical modulator 102. The continuous light inputted to the optical modulator 102 is modulated by the optical modulator 102, which is driven by the inputted modulated electrical signal, is outputted from the second optical waveguide 105 and is taken out by the optical fiber 114.

Figure 2:
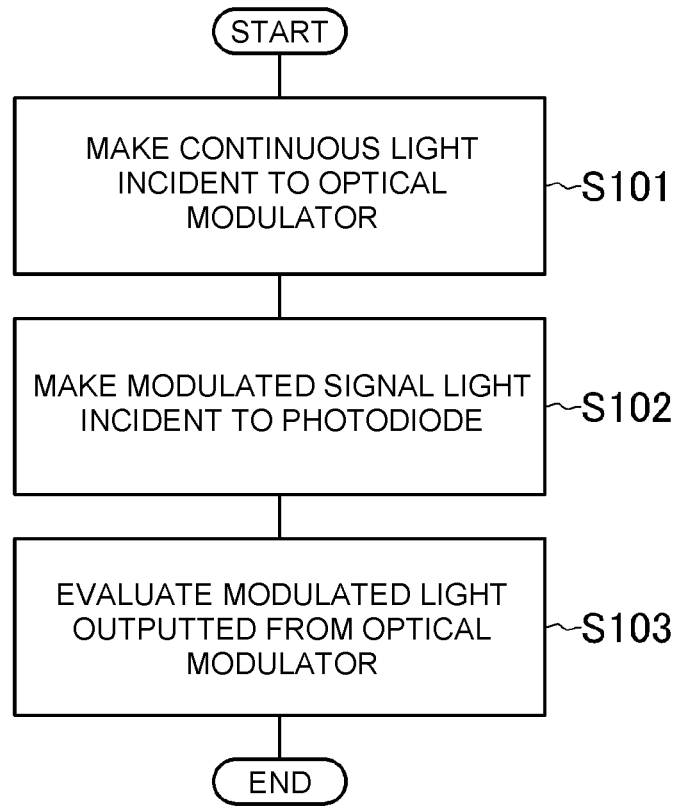
FIG. 2 is a flowchart for explaining an optical inspection method according to the embodiment of the present invention.

Hereinafter, an optical inspection method according to an embodiment of the present invention will be described with reference to FIG. 2. First, in a first step S101, continuous light emitted from a light source 113 is made incident via a first optical waveguide 104 to an optical modulator 102. Next, in a second step S102, modulated light modulated by an optical modulator 110 is made incident to a photodiode 103. As described above, a modulated electrical signal is outputted from the photodiode 103, to which the modulated light is made incident, to the optical modulator 102. The optical modulator 102 modulates the inputted continuous light by the modulated electrical signal received by the photodiode 103 and outputs the modulated continuous light.

Thereafter, in a third step S103, the modulated light outputted from the optical modulator 102 is evaluated. By conducting evaluation such as comparison between the modulated light outputted from the optical modulator 102 and taken out from the optical fiber 114 and the modulated light outputted from the optical modulator 110 (inputted to the photodiode 103), inspection of the optical modulator 102 at a wafer level can be implemented.

As described above, according to the present embodiment, without requiring a probe card which is excellent in high frequency characteristics and a high frequency cable for connecting a probe card outside a wafer and a device on the wafer, the inspection of the optical modulator 102 at the wafer level can be implemented.

Figure 3:
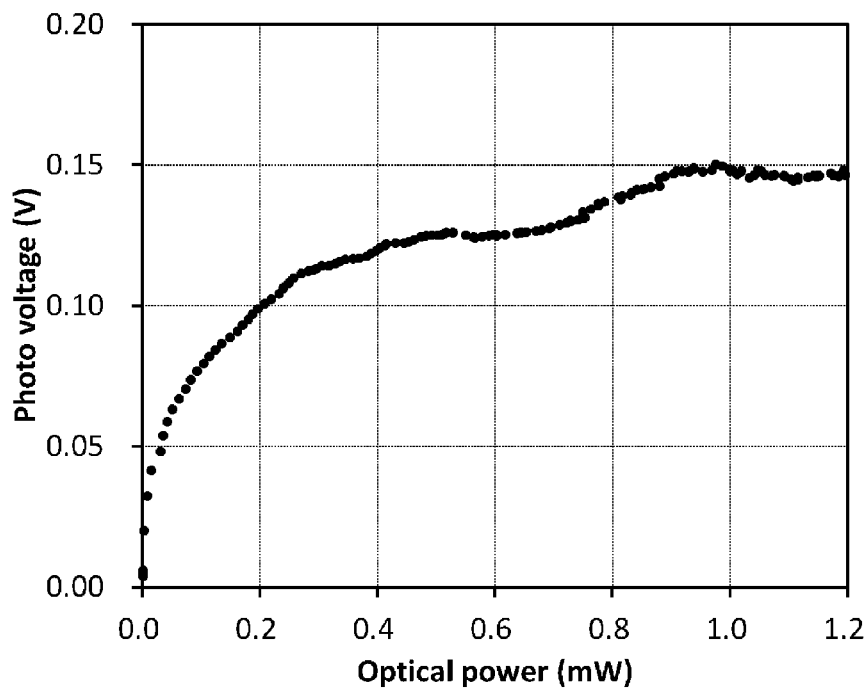
FIG. 3 is a characteristic diagram showing a result of measuring a voltage of an electrical signal, which a photodiode outputs, with respect to power of light inputted to the photodiode.

For example, when with respect to power of the light inputted to the photodiode 103, a voltage of the electrical signal which the photodiode 103 outputs is measured, change of the voltage occurs as shown in FIG. 3. As shown in FIG. 3, when light of approximately one mW is inputted to the photodiode 103, a voltage of approximately 0.15 V is generated.

Figure 4:
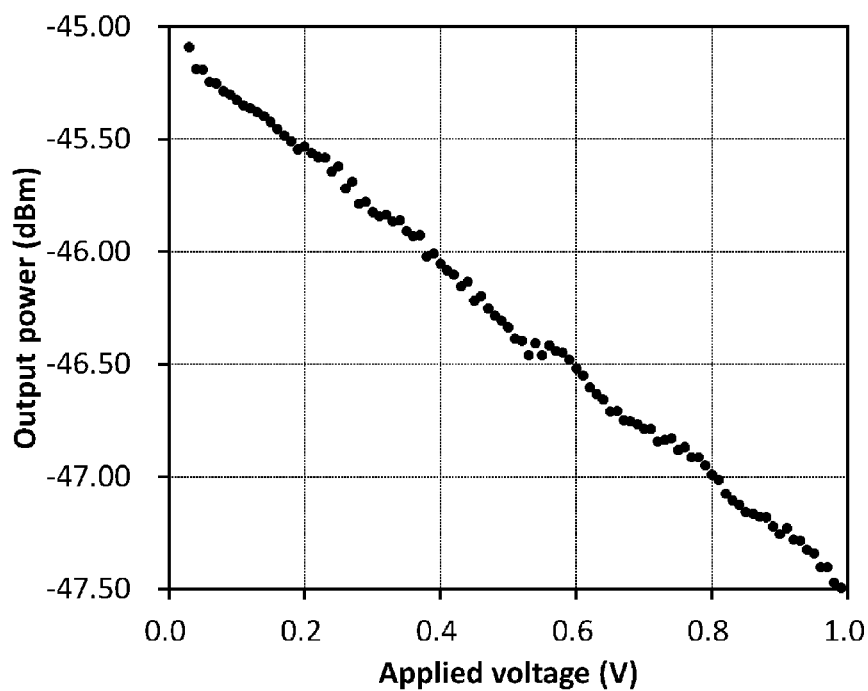
FIG. 4 is a characteristic diagram showing a result of measuring relationship between a voltage of an electrical signal which is inputted (applied) to an optical modulator and light which is modulated by the optical modulator and is outputted.

On the other hand, a result of measuring relationship between a voltage of an electrical signal inputted (applied) to the optical modulator 102 and light outputted from the optical modulator 102 is shown in FIG. 4. As shown in FIG. 4, it is seen therefrom that when an electrical signal of a voltage of approximately 0.2 V is applied to the optical modulator 102, change of approximately 0.5 dB occurs in the outputted light.

Figure 5:
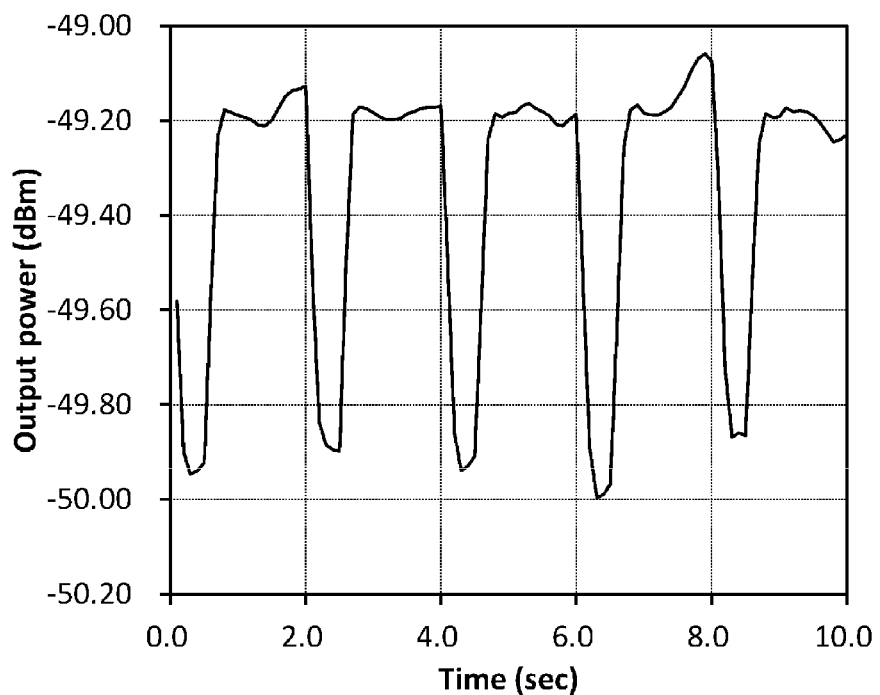
FIG. 5 is a characteristic diagram showing a light output waveform of modulated light obtained when a light pulse of one mW at peak power is inputted to the photodiode connected to the optical modulator by a wire, the modulated light, as a result of this, being outputted from the optical modulator.

Next, a light pulse (modulated light) of one mW at peak power is inputted to the photodiode 103 connected to the optical modulator 102 by the wire 107, and as a result of this, a light output waveform of the modulated light outputted from the optical modulator 102 is shown in FIG. 5. As is predicted from the results shown in FIG. 3 and FIG. 4, the light modulated signal of approximately 0.5 dB is outputted, and it is indicated that the optical inspection circuit according to the present embodiment enables characteristic inspection of the optical modulator 102.

Figure 6:
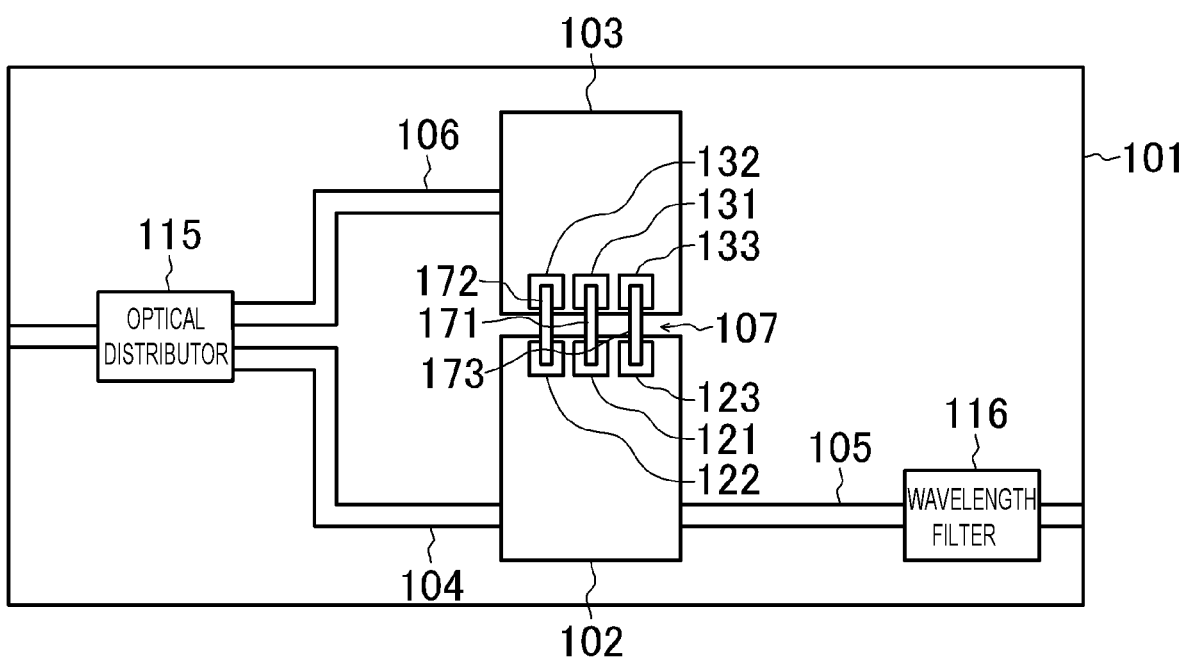
FIG. 6 is a configuration diagram illustrating a configuration of another optical inspection circuit according to the embodiment of the present invention.

Next, another optical inspection circuit according to the embodiment of the present invention will be described with reference to FIG. 6. This optical inspection circuit includes an optical modulator 102 formed on a substrate 101 and a photodiode 103 formed on the substrate 101 in the vicinity of the optical modulator 102. In addition, optically connected to the optical modulator 102 are a first optical waveguide 104 and a second optical waveguide 105. In addition, optically connected to the photodiode 103 is a third optical waveguide 106. In addition, the optical modulator 102 and the photodiode 103 are electrically connected by a wire 107. The configuration of these is similar to that of the optical inspection circuit described with reference to FIG. 1.

This optical inspection circuit further includes an optical distributor 115 which distributes inputted signal light to the first optical waveguide 104 and the third optical waveguide 106. In addition, the optical inspection circuit includes a wavelength filter 116 which takes out light having a predetermined wavelength from light outputted from the optical modulator 102. The optical distributor 115 and the wavelength filter 116 are formed on the substrate 101. In addition, each of the optical distributor 115 and the wavelength filter 116 comprises an optical waveguide having a core comprising a semiconductor.

The optical distributor 115 is to distribute inputted light power to a plurality of optical waveguides and can be configured of, for example, a Y-branch circuit. In addition, the optical distributor 115 can also be configured of a multi-mode interferometer. In addition, the optical distributor 115 can also be configured of a directional coupler. The wavelength filter 116 can be configured of a two-output optical circuit having wavelength dependence. The wavelength filter 116 can be configured of, for example, an array diffraction grating, an asymmetric Mach-Zehnder interferometer, a directional coupler, or the like.

In this optical inspection circuit, continuous light and modulated light are multiplexed and the multiplexed light is inputted to the optical distributor 115. The optical distributor 115 distributes the multiplexed continuous light and the modulated light. Accordingly, the multiplexed continuous light and the modulated light are inputted to both of the optical modulator 102 and the photodiode 103. In this configuration, a modulated electrical signal generated by the photodiode 103 by the modulated light in the multiplexed light is used, and the optical modulator 102 modulates inputted light. The multiplexed continuous light and the modulated light are inputted to the optical modulator 102, and of this inputted light, the continuous light is targeted for the modulation and the modulated light becomes noise. The light corresponding to the noise is eliminated by the wavelength filter 116. This optical inspection circuit has excellent effects which allow a number of the optical waveguides for inputting to be reduced to one.

Figure 7:
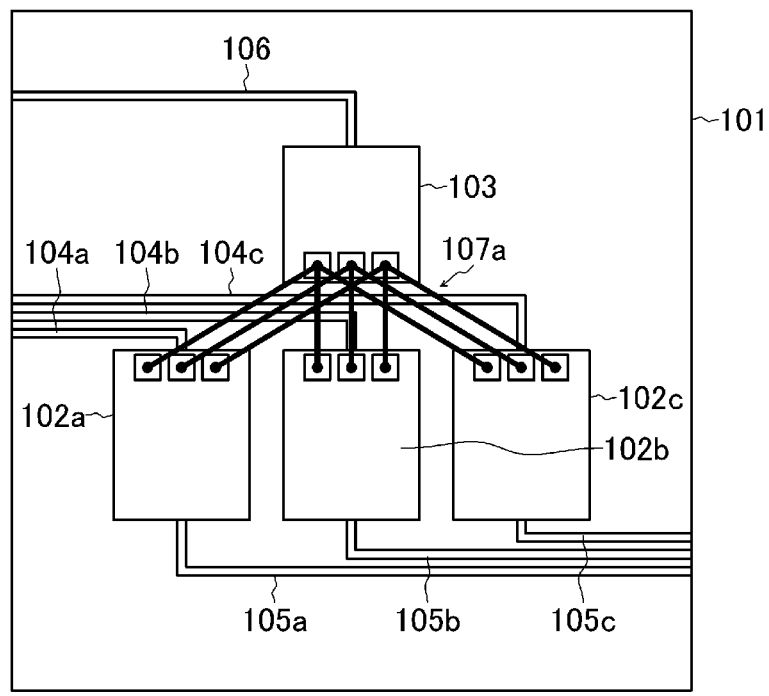
FIG. 7 is a configuration diagram illustrating a configuration of still another optical inspection circuit according to the embodiment of the present invention.

Next, still another optical inspection circuit according to the embodiment of the present invention will be described with reference to FIG. 7. This optical inspection circuit includes a plurality of optical modulators 102a, 102b, and 102c formed on a substrate 101 and a photodiode 103 formed on the substrate 101 in the vicinity of the optical modulator 102a, 102b, 102c.

Optically connected to the optical modulator 102a are a first optical waveguide 104a and a second optical waveguide 105a. Optically connected to the optical modulator 102b are a first optical waveguide 104b and a second optical waveguide 105b. Optically connected to the optical modulator 102c are a first optical waveguide 104c and a second optical waveguide 105c. In addition, optically connected to the photodiode 103 is a third optical waveguide 106.

In addition, each of the optical modulators 102a, 102b, and 102c and the photodiode 103 are electrically connected by a wire 107a. The wire 107a can be formed by, for example, wire bonding. In addition, the wire 107a can also be configured of the heretofore known multilayer wiring structure formed in a surface layer of the substrate 101.

This optical inspection circuit has excellent effects which allow the plurality of optical modulators 102a, 102b, and 102c to be inspected by the modulated electrical signal generated by one photodiode 103.

Figure 8:
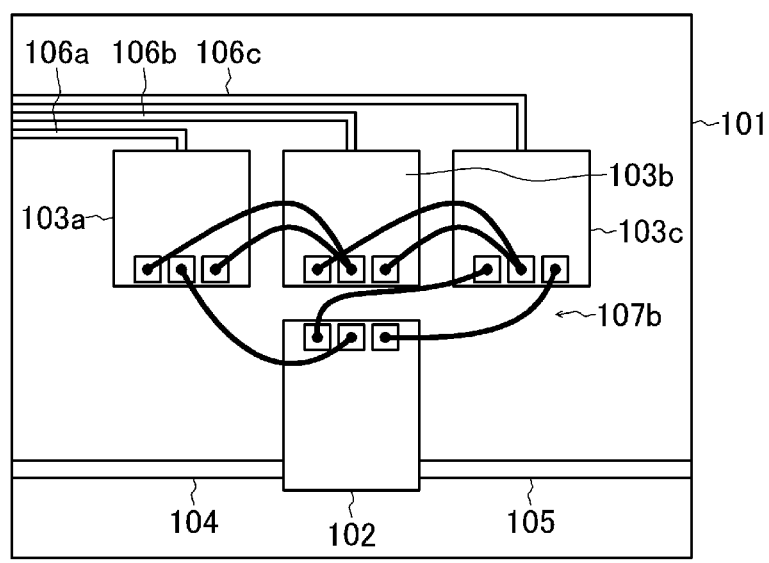
FIG. 8 is a configuration diagram illustrating a configuration of yet another optical inspection circuit according to the embodiment of the present invention.

Next, yet another optical inspection circuit according to the embodiment of the present invention will be described with reference to FIG. 8. This optical inspection circuit includes an optical modulator 102 formed on a substrate 101 and a plurality of photodiodes 103a, 103b, and 103c formed on the substrate 101 in the vicinity of the optical modulator 102.

In addition, optically connected to the optical modulator 102 are a first optical waveguide 104 and a second optical waveguide 105. In addition, optically connected to the photodiode 103a is a third optical waveguide 106a. In addition, optically connected to the photodiode 103b is a third optical waveguide 106b. In addition, optically connected to the photodiode 103c is a third optical waveguide 106c.

In addition, the optical modulator 102 and the photodiode 103 are electrically connected by a wire 107b. The photodiodes 103a, 103b, and 103c whose number is plural are series-connected to the optical modulator 102 by the wire 107b. The wire 107b can be formed by, for example, wire bonding. In addition, the wire 107b can also be configured of the heretofore known multilayer wiring structure formed in a surface layer of the substrate 101. By employing this optical inspection circuit, the plurality of photodiodes 103a, 103b, and 103c is used, and a modulated electrical signal having further large voltage can be thereby generated, and thus, the optical inspection circuit has excellent effects which enables inspection of a characteristic, which requires a large voltage, among modulation characteristics of the optical modulator 102.

As described hereinbefore, according to embodiments of the present invention, since on the substrate on which the optical modulator is formed, the photodiode is formed, and the optical modulator and the photodiode are electrically connected by the wire, inspection of an optical circuit such as an optical modulator at a wafer level can be further easily and further inexpensively implemented.

Note that the present invention is not limited to the above-described embodiment and it is apparent that many modifications and combinations can be implemented by those having ordinary skill in the art without departing from the spirit and scope of technical idea of the present invention.

REFERENCE SIGNS LIST

101 Substrate
102 Optical modulator
103 Photodiode
104 First optical waveguide
105 Second optical waveguide
106 Third optical waveguide
107 Wire
109 Optical fiber
110 Optical modulator
111 Light source
112 Optical fiber
113 Light source
114 Optical fiber
121, 122, 123 Electrode pad
131, 132, 133 Electrode pad
171 Signal wire
172, 173 Grounding wire

The invention claimed is:

1. An optical inspection circuit comprising:
a first optical modulator comprising an optical waveguide on a substrate, the optical waveguide having a core comprising a semiconductor;
a first input waveguide optically connected to the first optical modulator, the first input waveguide having a core comprising the semiconductor;
an output waveguide optically connected to the first optical modulator, the output waveguide having a core comprising the semiconductor;
a photodiode on the substrate in a vicinity of the first optical modulator;
a wire electrically connecting the first optical modulator and the photodiode; and
a second input waveguide optically connected to the photodiode, the second input waveguide having a core comprising the semiconductor;
wherein the photodiode is configured to:
receive modulated light from a second optical modulator via the second input waveguide,
photoelectrically convert the modulated light to a modulated electrical signal, and
output the modulated electrical signal to the first optical modulator; and wherein the first optical modulator is configured to:
receive continuous light via the first input waveguide,
modulate the continuous light by the modulated electrical signal received from the photodiode, and
output the modulated continuous light via the output waveguide.

2. The optical inspection circuit of claim 1, wherein the first optical modulator is one of a plurality of optical modulators, and the wire connects each of the plurality of optical modulators and the photodiode.

3. The optical inspection circuit of claim 1, wherein the photodiode is one of a plurality of photodiodes, and the wire connects the optical modulator and each of the plurality of photodiodes.

4. The optical inspection circuit of claim 1 further comprising:
an optical distributor configured to distribute inputted signal light to the first input waveguide and to the second input waveguide.

5. The optical inspection circuit of claim 1, wherein
the semiconductor comprises silicon, and
the photodiode is a germanium photodiode.

6. An optical inspection method comprising:
making first modulated light from a first optical modulator incident to a photodiode on a substrate, the first modulated light being photoelectrically converted to a modulated electrical signal by the photodiode;
outputting the modulated electrical signal to a second optical modulator electrically connected to the photodiode, the second optical modulator comprising an optical waveguide on the substrate in a vicinity of the photodiode, the optical waveguide having a core comprising a semiconductor;
making continuous light incident to the second optical modulator, the continuous light being modulated by the modulated electrical signal to output second modulated light; and
evaluating the second modulated light outputted from the second optical modulator.

7. The optical inspection method of claim 6, wherein making the first modulated light incident to the photodiode comprises:
making the first modulated light incident to a plurality of photodiodes, the first optical modulator electrically connected to each of the plurality of photodiodes.

8. The optical inspection method of claim 6, wherein making the continuous light incident to the second optical modulator comprises:
making the continuous light incident to a plurality of optical modulators, each of the plurality of optical modulators electrically connected to the photodiode.

9. An optical inspection circuit comprising:
an optical distributor configured to distribute multiplexed light comprising continuous light and first modulated light modulated by a first optical modulator;
a photodiode on a substrate and optically connected to the optical distributor, the photodiode configured to receive the multiplexed light and to photoelectrically convert the first modulated light in the multiplexed light to a modulated electrical signal;
a second optical modulator on the substrate in a vicinity of and electrically connected to the photodiode and optically connected to the optical distributor, the second optical modulator configured to receive the multiplexed light, to modulate the continuous light in the multiplexed light by the modulated electrical signal received from the photodiode, and to output resulting light comprising noise and second modulated light; and a filter optically connected to the second optical modulator, the filter configured to receive the resulting light and to eliminate the noise from the resulting light.

10. The optical inspection circuit of claim 9, wherein the optical distributor comprises a Y-branch circuit, a multimode interferometer, or a directional coupler.

11. The optical inspection circuit of claim 9, wherein the photodiode is a germanium photodiode comprising a germanium layer on a silicon core.

12. The optical inspection circuit of claim 9, wherein the second optical modulator is a Mach-Zehnder optical modulator.

13. The optical inspection circuit of claim 9 further comprising:

wire bonds electrically connecting the second optical modulator to the photodiode.

14. The optical inspection circuit of claim 9 further comprising:

a multilayer wiring structure electrically connecting the second optical modulator to the photodiode.

* * * * *